May 27, 1952        E. FUCHS        2,598,047
AUTOMATIC CYLINDRICAL PRINTING APPARATUS
Filed Nov. 10, 1947        5 Sheets-Sheet 1
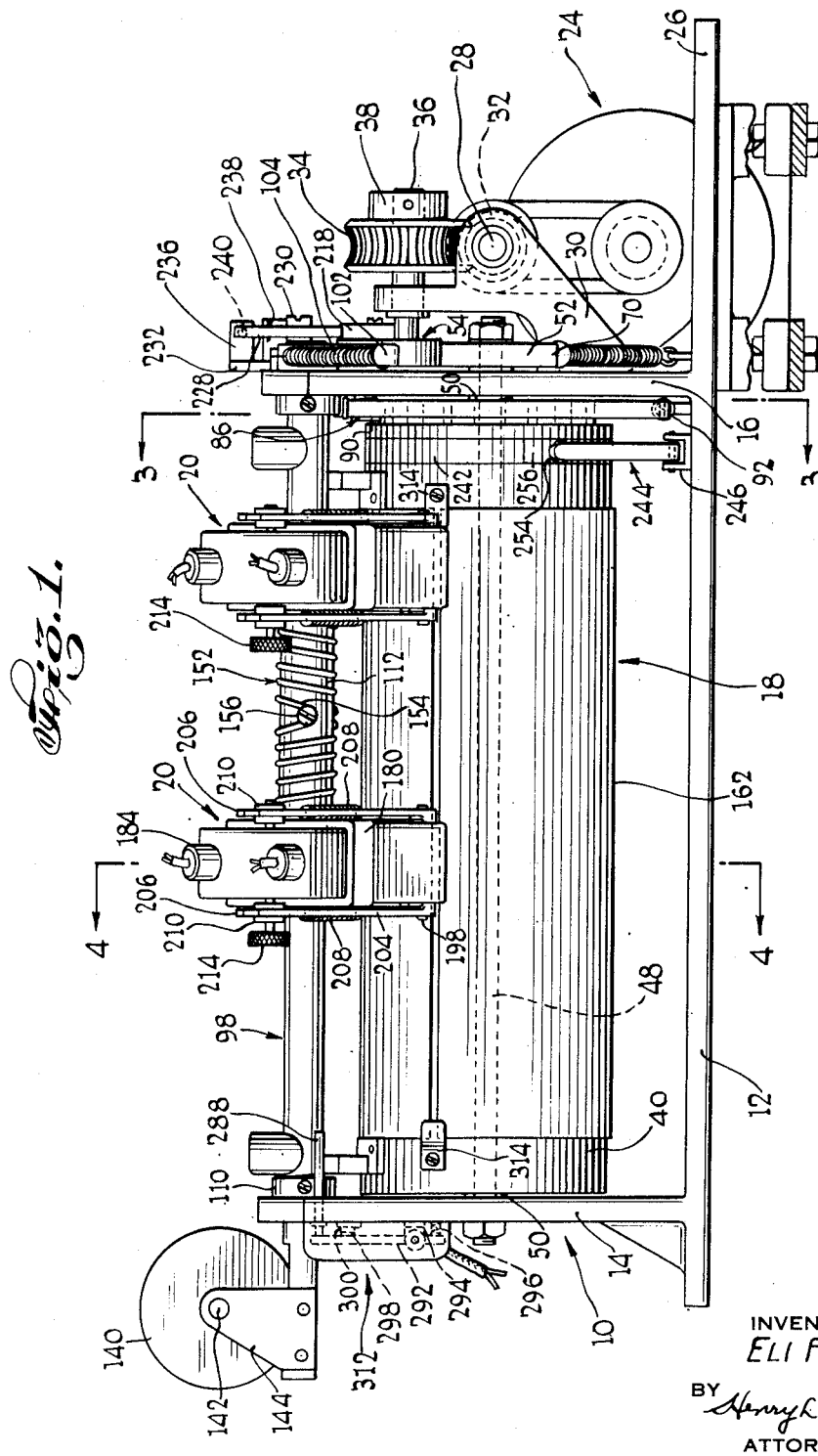
INVENTOR
*ELI FUCHS*
BY
*Henry L. Burkitt*
ATTORNEY May 27, 1952  E. FUCHS  2,598,047
AUTOMATIC CYLINDRICAL PRINTING APPARATUS
Filed Nov. 10, 1947  5 Sheets-Sheet 2
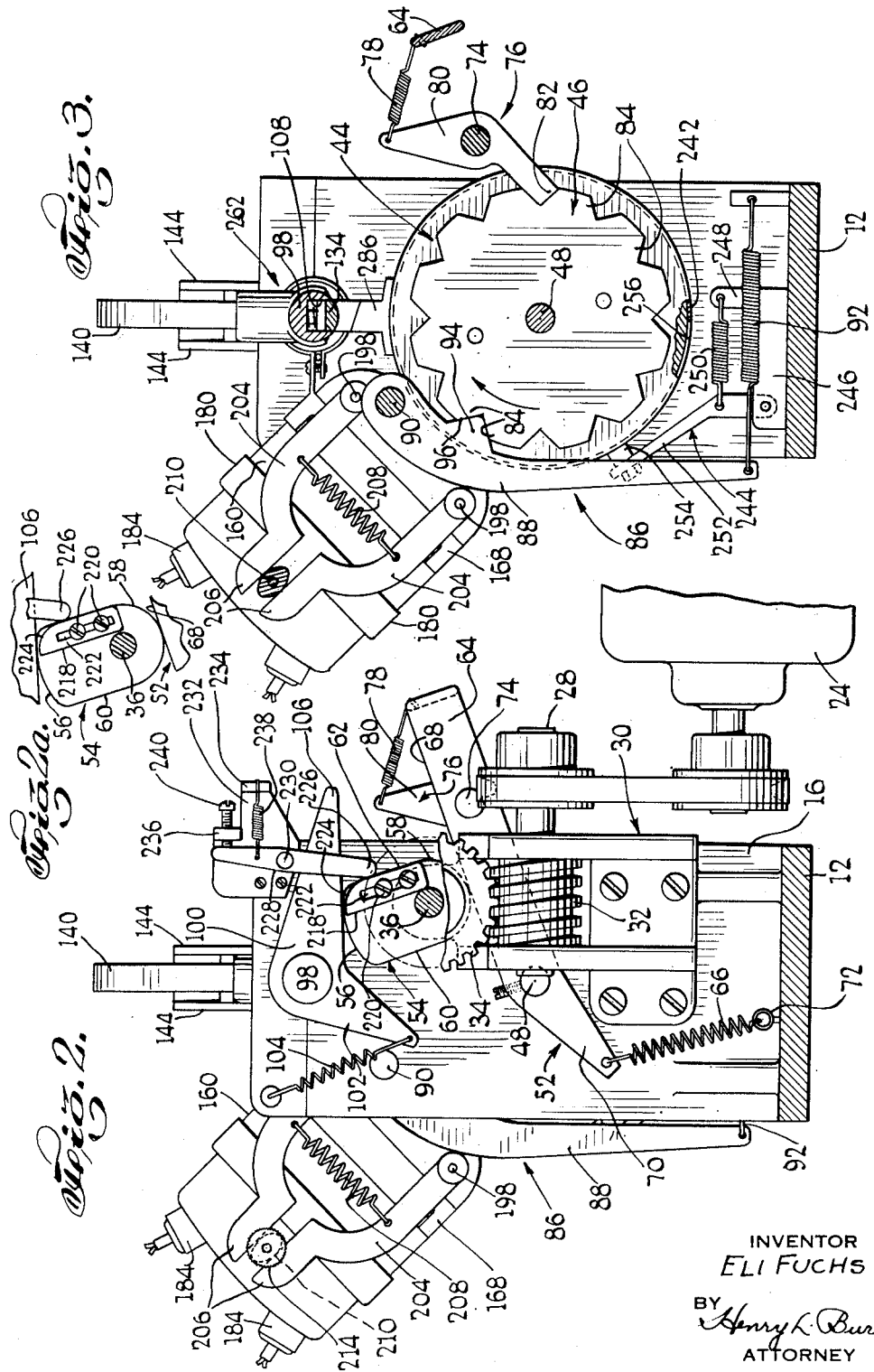
INVENTOR
ELI FUCHS
BY
Henry L. Burkitt
ATTORNEY

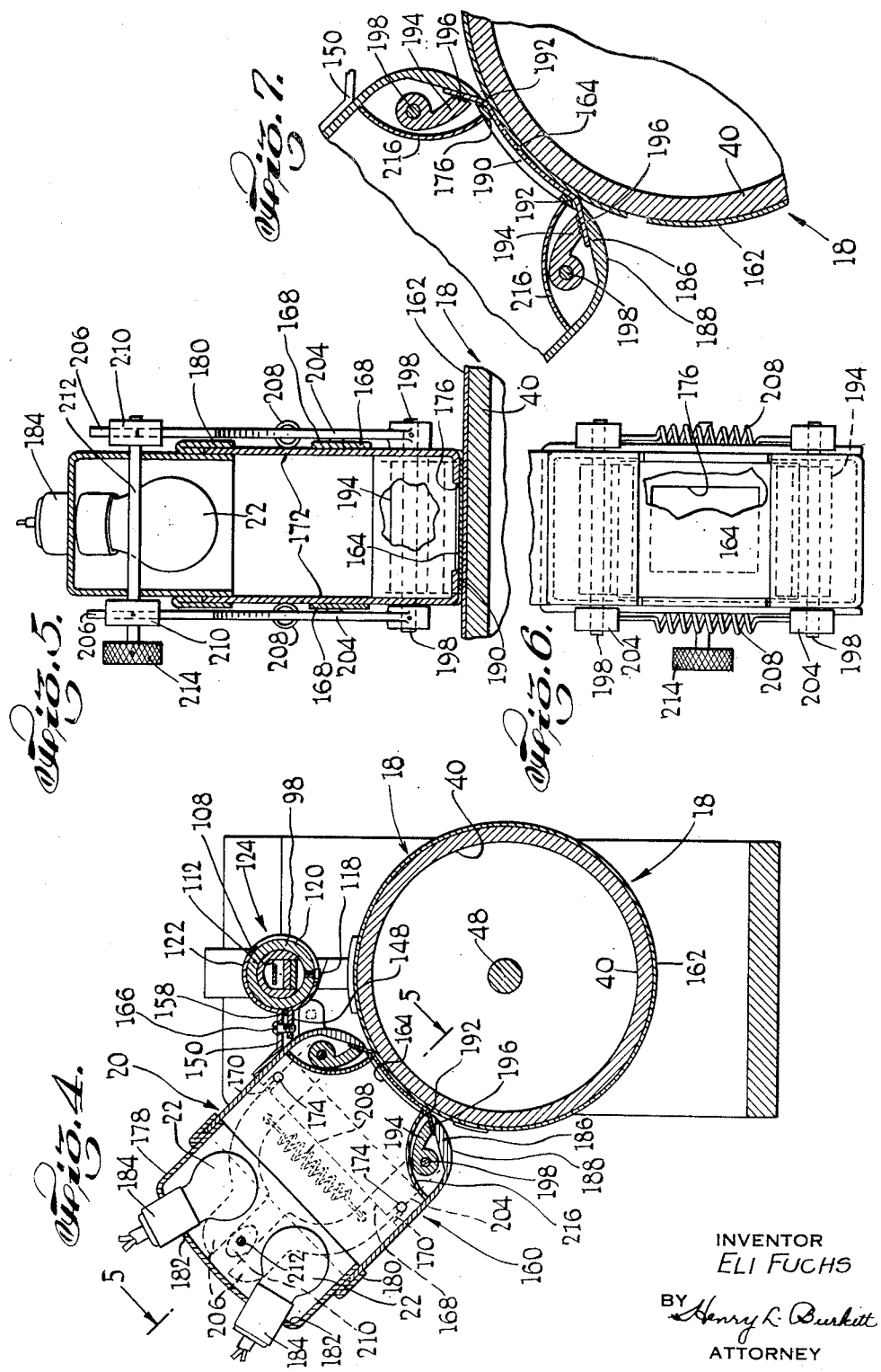

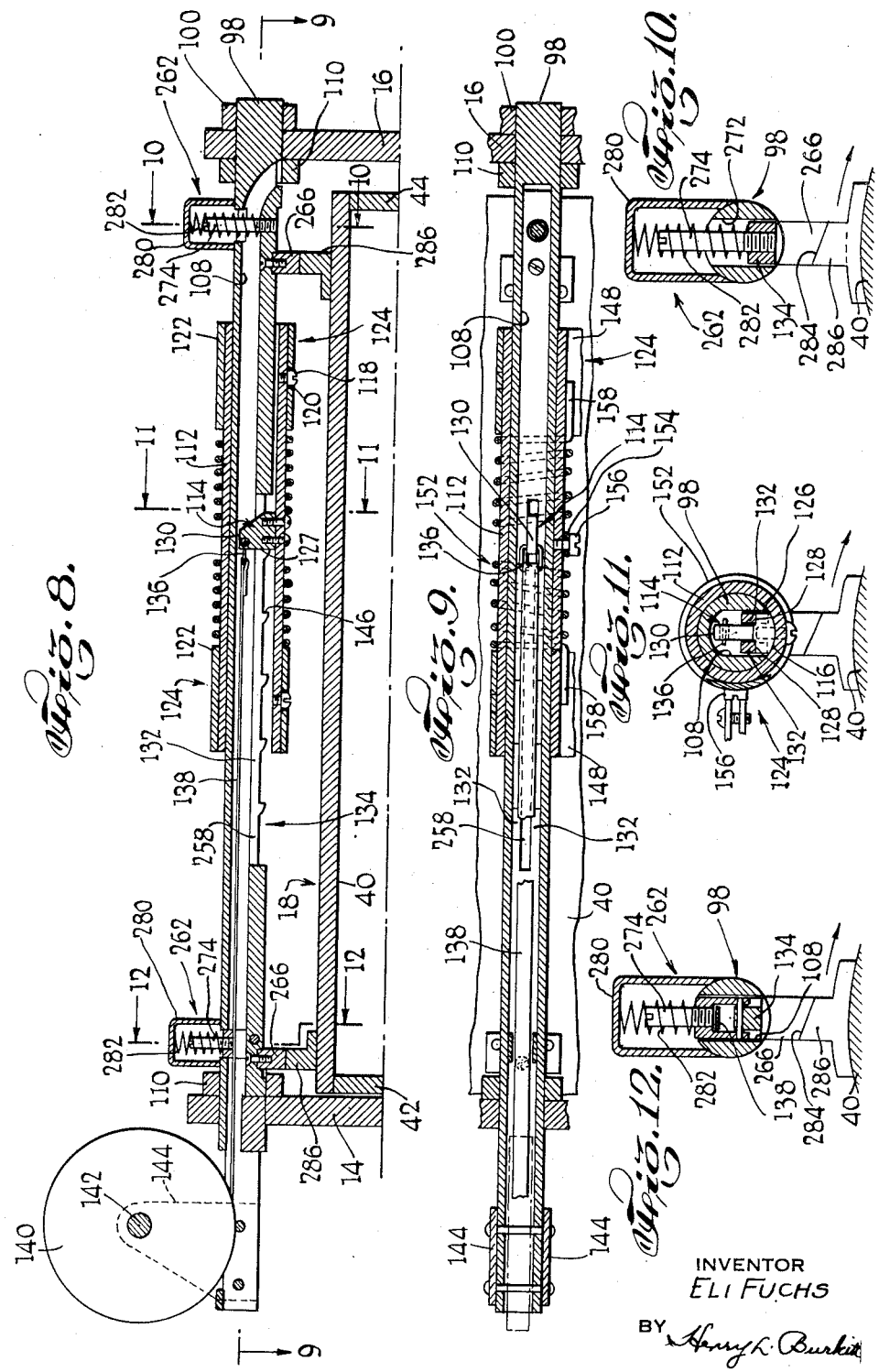

May 27, 1952          E. FUCHS          2,598,047
AUTOMATIC CYLINDRICAL PRINTING APPARATUS
Filed Nov. 10, 1947          5 Sheets-Sheet 5
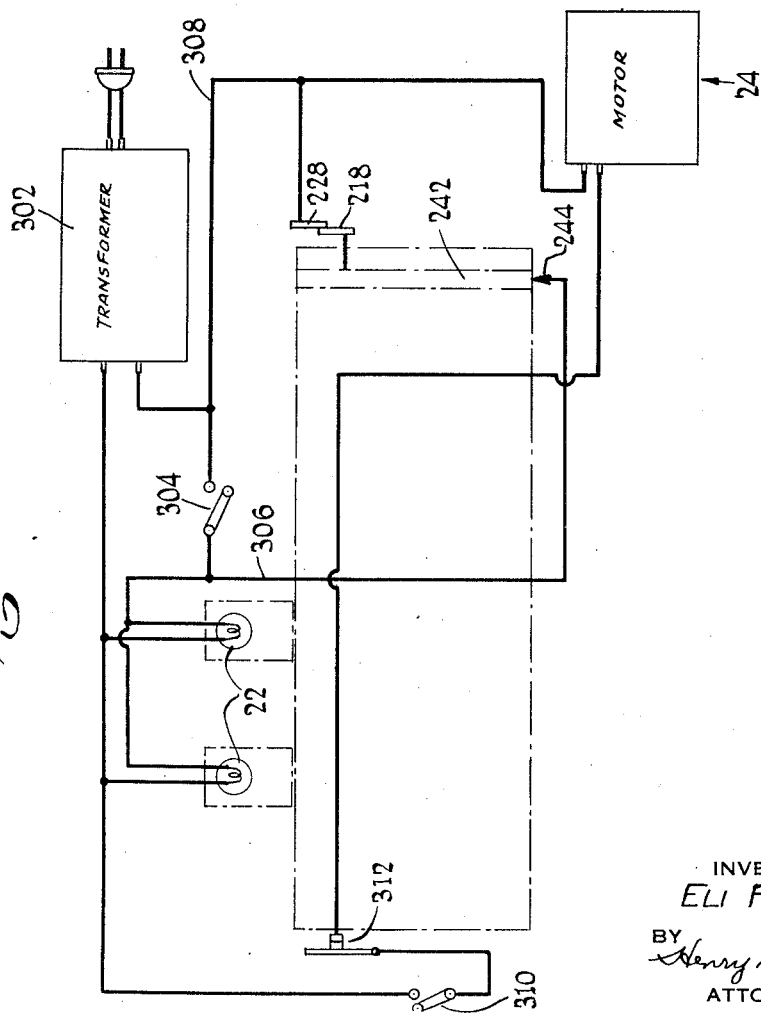
INVENTOR
ELI FUCHS
BY
Henry L. Burkitt
ATTORNEY Patented May 27, 1952

2,598,047

UNITED STATES PATENT OFFICE 2,598,047

AUTOMATIC CYLINDRICAL PRINTING APPARATUS

Eli Fuchs, Highland Park, N. J.

Application November 10, 1947, Serial No. 785,060

15 Claims. (Cl. 95—77.5)

This invention relates to an automatic cylindrical printing apparatus.

In order to produce a plurality of identical images of a photograph, as, for instance, for railroad tickets or other similar purposes, it has heretofore been necessary to make a separate manual exposure for each image. Such procedure is necessarily expensive; the results are of a relatively varying nature as there is no accurate controls of such factors as timing.

It is an object of the invention to provide an apparatus for producing, from a single negative, a plurality of substantially identical reproductions all of substantially the same exposure effect.

It is an object of the invention to provide an apparatus for producing, by a substantially automatic apparatus, and substantially without manual intervention after the apparatus has been set up and set into motion, a plurality of substantially identical reproductions from a single negative.

It is an object of the invention to provide an apparatus for producing from a single member a plurality of substantially identical reproductions, wherein it is possible to vary the exposure time and the instant when exposure is effected in relation to the cycle of the process.

It is an object of the invention to provide a device wherein a single negative is positioned in relation to a light source and a light-sensitive member, and wherein light from the source may be effective when only a very limited portion of the light-sensitive member is exposed to light rays from the source, and wherein the controls are so interlocked that the source is de-energized before its rays may affect any other part of the light-sensitive member, as, for instance, when the negative is being transferred from one position on the light-sensitive member to another.

It is an object of the invention to provide a light-sensitive member so supported and so controlled in its movements with relation to a single negative that a plurality of substantially identical exposures along a single line may be obtained from that single negative, and a plurality of such lines of exposures, substantially parallel to each other, may be produced consecutively and automatically after the apparatus has been set in action.

It is an object of the invention to provide apparatus wherein a single driving device may be effective in producing its various functions, including a step-by-step movement relatively to each other of the light-sensitive member, the negative and the light source, and wherein a light source also is controlled by movement derived from the single driving device.

It is an object of the invention to provide, in apparatus of the type indicated, a cylinder upon which a light-sensitive member may be disposed, wherein a negative for producing a plurality of exposures upon the light-sensitive member is moved toward and away from the cylinder as it is rotated, and wherein means are provided for producing motion of the light-sensitive member and the negative laterally with relation to each other for producing a plurality of lines of exposure.

Other objects of the invention will be set forth hereinafter, or will be apparent from the description and the drawings, in which is illustrated an embodiment exemplifying the invention.

The invention, however, is not intended to be restricted to any particular construction, or any particular arrangement of parts, or any particular application of any such construction or arrangement of parts, or any specific method of operation or use, or any of the various details thereof, even where specifically shown and described herein, as the same may be modified in various particulars, or may be applied in many varied relations, without departing from the spirit and scope of the claimed invention, of which the exemplifying embodiment, herein shown and described, is intended only to be illustrative, and only for the purpose of complying with the requirements of the statutes for disclosure of an operative embodiment, but not to show all the various forms and modifications in which the invention might be embodied.

On the drawings, in which the same reference characters refer to the same parts throughout, and in which is disclosed such a practical construction, Fig. 1 is a front elevational view of apparatus embodying the invention, a part of the support being broken away;

Fig. 2 is an end elevational view, looking at the apparatus from the right-hand end of Fig. 1, a part of the motor and the driving mechanism being broken away to disclose part of the operating mechanism;

Fig. 2a is a detail elevational view of a portion of the structure shown in Fig. 2;

Fig. 3 is a vertical cross-sectional view, substantially on the line 3—3 of Fig. 1;

Fig. 4 is a vertical cross-sectional view, substantially on the line 4—4 of Fig. 1;

Fig. 5 is a cross-sectional view, through a portion of the assembled lamp housing and drum of Fig. 4, substantially on the line 5—5 of Fig. 4;

Fig. 6 is a bottom plan view of a portion of the lamp housing and film retaining unit;

Fig. 7 is a detail cross-sectional view, to enlarged scale, of a portion of the structure shown in Fig. 4;

Fig. 8 is a longitudinal vertical-cross-sectional view through a portion of the apparatus shown in Fig. 1, parts being broken away, and other parts being shown in elevation, for clarity.

Fig. 9 is a horizontal cross-sectional view, substantially on the line 9—9 of Fig. 8, of a portion of the apparatus including the slide adjusting means;

Fig. 10 is a vertical cross-sectional view, substantially on the line 10—10 of Fig. 8, illustrating a detail of the construction;

Fig. 11 is a vertical cross-sectional view, substantially on the line 11—11, of the apparatus shown in Fig. 8, illustrating details of the housing moving means;

Fig. 12 is a detail vertical cross-sectional view, substantially on the line 12—12 of Fig. 8, illustrating the arrangement of the catch bar depressing means at one end of the carriage;

Fig. 13 is a view, diagrammatically showing the arrangement of the apparatus and the wiring thereof, to disclose the electrical circuit; and Fig. 14 is a plan view of a sensitized sheet, illustrating by dot-and-dash lines the disposition of the exposed portions produced by the apparatus disclosed.

On Fig. 1, apparatus 10 is shown mounted upon a support including base 12 and end frame walls 14 and 16 extending upwardly from the base. Between the frame walls is positioned a drum 18. Disposed cooperatively with relation to drum 18 are exposure-producing devices 20. Device 20, in the manner to be described, moves toward and away from the drum; during and in relation to such movement, the action of light sources 22 are controlled. A single motor 24 is utilized to produce the various several movements of the entire apparatus.

Motor 24 may be associated with apparatus 10 in any desired manner. In the instance shown, the motor is mounted upon an extension 26 of base 12 beyond frame wall 16. The motor, by any suitable means such as a belt and pulleys or the like, delivers power to means such as a countershaft 28 which may be carried in a bracket 30 secured in place in any desired manner, as, for instance, upon frame wall 16. Between the arms of bracket 30 may be positioned a worm 32 fixed to countershaft 28. Worm 32 is in mesh with a worm gear 34; the gear is secured upon a shaft 36. Shaft 36, which is carried in and extends through bearings in bracket 30 and frame wall 16, has an enlarged portion to abut against one of the arms of bracket 30. A collar 38 secured to the shaft and abutted against gear 34 then serves to hold the shaft and the gear in place with relation to wall 16, the shaft terminating in the bearing in that wall.

Drum 18 may be made in any desired manner; it may comprise a shell 40, which may, for instance, be a section of tubing. End walls 42 and 44 are fixed in the shell in any suitable manner, as, for instance, by brazing. A ratchet 46 may be fixed to end wall 44 of drum 18 in any desired manner. Thus, when the drum is assembled in the apparatus, ratchet 46, in the illustrated instance, is positioned between frame wall 16 and end wall 44. A rod 48, carried by frame walls 14 and 16, may provide a support upon which the drum may be rotated. The rod extends through openings provided in end walls 42 and 44, and ratchet 46, for that purpose. Suitable means, such as washers 50, may be disposed between walls 14 and 42, and between wall 16 and ratchet 46, to keep the drum in properly spaced relation to walls 14 and 16.

Rod 48 extends beyond walls 14 and 16. On the end of rod 48 extending beyond wall 16 a lever 52 is mounted for pivoting movement. Nuts engaged upon the ends of rod 48 extending beyond wall 14 and lever 52 hold the several parts in properly associated relationship.

On shaft 36, between wall 16 and bracket 30, is fixed a cam 54. The cam has a pair of rounded ends 56 and 58 which fillet into the surfaces of a pair of parallel side walls 60 and 62. An arm 64 of lever 52, by the action of a spring 66, has one edge face 68 pressed into engagement with the cam. Spring 66 is engaged between one end of an arm 70 of lever 52 and an anchor point 72 on base 12. Intermediately of arm 64 a pin 74 is mounted and provides a pivot for a pawl 76. A spring 78, anchored between an arm 80 of the pawl and a lug on arm 64, serves to maintain tooth 82 of the pawl in engagement with the teeth 84 of ratchet 46.

Thus, by engagement of pawl 76 with a tooth 84, and movement of lever 52 clockwise on its pivot on rod 48, the drum, secured to the ratchet, will be rotated. Such movement, by the intermittent action of pawl and ratchet, is intended to rotate the drum step-by-step. To retain the drum at a position to which it has been moved by this ratcheting action, a drum holding pawl 86 may be provided. Pawl 86 includes an arm 88 pivotally mounted upon a pin 90 which may be fixed in frame wall 16. Arm 88 is engaged at its end by a spring 92 which may be anchored to a lug on base 12. Spring 92 serves to maintain a tooth 94, formed as a part of pawl 86, pressed into engagement with a recess 96 between a pair of teeth 84 which have been moved into position by action of pawl 76 on ratchet 46. Tooth 94 and the recesses are so shaped that they tend to come to rest at a fixed end position for each position to which pawl 76 may move the ratchet on the operation of lever 52.

Above cam 54, a shaft 98 is provided a bearing in frame wall 16. Shaft 98 carries lamp housing arm 100, to end 102 of which is secured a spring 104, which, in turn, is anchored in an ear provided on wall 16. Spring 104 maintains finger 106 of arm 100 constantly in engagement with cam 54. Shaft 98 extends through wall 16 from the side at which cam 54 is located, to the side on which drum 18 is located. Beyond wall 16, the shaft has a deep, longitudinal channel or groove 108 formed therein in any suitable manner. For instance, the shaft may be made from solid stock, and the groove may be milled. Thus, the cross-section of the shaft will be substantially as shown in Fig. 11, substantially U-shaped. The outside surface of the shaft will still be substantially cylindrical except for the opening of the groove. In Fig. 11, the shaft is shown in the position it assumes normally; channel 108 then opens directly downwardly. Shaft 98 also extends to and is provided a bearing in wall 14. The shaft is held against endwise movement by collars 110, secured to the shaft as, for instance, by set-screws, so as to abut against the respective frame walls 14 and 16.

Encircling and slidably disposed upon shaft 98 is a sleeve 112, to which a channel key member 114 may be secured by suitable means such as screws. Member 114 may be provided with a rounded base 116 to seat upon the inner wall of sleeve 112. The heads 118 of screws 119, also secured in sleeve 112, moves within a slot 120 in the body 122 of lamp housing bracket 124, to be described. Member 114 is just wide enough and has side faces 126 squared with relation to top faces 128 so that the member may be received snugly within groove 108. The member has a leg 130 which extends upwardly and is received between the arms 132 of a catch bar 134, further to be described. Arms 132 normally rest on faces 128, except when lifted therefrom in the manner to be described.

Leg 130, above catch bar 134, provides means to which a loop 136 linked to a flexible band 138 may be engaged. The band extends lengthwise of shaft 98 through groove 108 to a position where it is wound upon a drum 140 carried upon a spindle 142 mounted upon a bracket 144 supported from frame wall 14. By means of a pawl device and a spring coiled around the spindle, or by any other suitable means (not shown, since spring tension devices of this type are conventional) band 138 is retained under tension sufficient to tend to draw sleeve 112 toward wall 14. The sleeve is restrained against such movement by engagement of end face 127 of member 114 against one of the stop teeth 146 on catch bar 134 in a manner to be described further.

Rotatively mounted upon sleeve 112 is body 122 of lamp housing bracket 124. Body 122 may be formed by bending a piece of metal into cylindrical form, so that a pair of arms 148 and 150 extend from the cylinder. Body 122 has slot 120 formed therein, in any suitable manner, to receive screw head 118. Engagement of head 118 with the ends of slot 120 limits rotation of bracket 124 with relation to sleeve 112, and, therefore, with relation to shaft 98. A spring 152 may be coiled around sleeve 112, and have a loop 154 caught upon an anchoring screw 156. A free end 158 (Fig. 9) of the spring is brought into position to bear upon arm 148. In the illustration, spring 152 is shown to have two free ends 158 bearing upon two arms 148, which each individually carry a lamp housing 160. From the further description, it will be clear that but a single lamp housing, or any desired number of lamp housings may be associated with bracket 124, and be made effective simultaneously so as to complete the printing of one of more sheets of light-sensitized material 162 from one or more negatives 164 (Fig. 4) simultaneously effective for that purpose.

Each pair of arms 148 and 150 is restrained against separation by means of a bolt 166 positioned in an opening in arm 150 and engaged in a threaded opening in the other arm 148. Bracket 124 is thus effective normally to move arm 150 downwardly into the position shown in Fig. 4.

Arm 150 may be of a forked construction providing a pair of substantially vertically upstanding but forwardly directed wings 168, each of which has a pair of substantially vertically extending, upwardly opening slots 170. While only a single pair of wings 168 is shown, it has been noted that arm 150 may be representative of one of a plurality of such arms integral with bracket 124, or a single arm 150 may have a plurality of spaced apart sets of wings 168, to provide support for a pair or a plurality of housings 160. Arms 150 or the sets of wings 168 are spaced apart in such case a sufficient distance to position the lamp housings for producing properly spaced lines of exposure for each housing in order to complete the exposure of an entire sensitized member 162 in a single series of operations. However, for purposes of clarity, the structure is described in relation to a single housing.

In side walls 172 of each lamp housing 160 a pair of pins 174 may be secured, by riveting or similar method. The pins are spaced apart for reception in slots 170 for a simple assembly of the housing with the bracket. Housing 160 may take any desired form to provide it with light sealing qualities except at a bottom opening 176. A cover 178 for the housing may have a lip 180. When cover 178 is seated upon the top edge of the housing, lip 180 will cooperate with the housing to assure against escape of light rays at that position. At a pair of openings 182 in the top wall of the cover, the necessary sockets 184 for retaining electric light bulbs for light sources 22 are secured. Suitable conductors, led up to these bulbs, are parts of the circuits controlled by means to be described for energizing the light sources. Housing 160 and cover 178, at all positions including those of the association of sockets 184 with the cover, are constructed to prevent the passage of light rays from bulbs 22 except through opening 176.

Housing wall 186 in which opening 176 is provided has rounded sections 188, joined together by an upwardly dished mid-section providing a hollow 190 which conforms in its radius of curvature substantially with that of drum 18. Opening 176 may take the form of the frame of a picture. Adjacent each lateral edge of opening 176, a slit 192 may be formed. This slit is wide enough to receive the thickness and width of negative 164 or other transparency to be used in the production of exposures by the apparatus. The negative is slid through the slits; when in that position, the negative itself serves to prevent passage of light rays through the slits. The only light which may then pass to the outside of the housing is that which passes through the negative itself.

Within housing 160, and adjacent each slit 192, is positioned a gripper finger 194 which terminates in negative-engaging surfaces 196 to clamp the ends of the negative extending through slits 192 against wall 186. Each finger is fixed to a pin 198 which may be provided a mounting in recesses or openings in walls 172 of housing 160. Each pin may carry arms 204 which extend upwardly outside the housing and terminate in cam ends 206. Arms 204 have coiled springs 208 anchored thereto and engaged across between pairs of the arms to hold ends 206 pressed against cams 210 which are mounted upon a rod 212. Rod 212 is provided bearings in the walls of cover 178, and is extended beyond the cover on one side for provision of a knurled knob 214. Rotation of knob 214 will force cam ends 206 apart; arms 204 will then cause pins 198 to rotate slightly in order to lift surfaces 196 slightly out of engagement with the negative ends which were being pressed against wall 186.

Apparatus such as this provides means for retaining a negative firmly in position, and so that the negative may be removed from that position whenever desired. Upon movement of knob 214 to release cams 210, springs 208 will return surfaces 196 to the negative-engaging position. Surfaces 196 may be knurled or otherwise roughened to assure positive engagement with the negative for retaining it in position.

A baffle 216 may be arranged to house each gripper finger 194 in order further to reduce the effect from chance passage of light rays through slits 192. Such baffles may be placed in position in housing 160 immediately after the assembly of the gripper fingers in the housing.

Thus, to position a negative, knob 214 is manipulated, surfaces 196 are moved out of contact with wall 186, a negative is inserted through slits 192 so that its edges are beneath the surfaces, and knob 214 is again manipulated so that surfaces 196 engage the negative against wall 186. The portion of the negative to be printed appears at opening 176. When housing 160 now is moved to a position against drum 18, in the manner to be described, negative 164 is shaped, by its position in slits 192, and the angle of the slits with relation to wall 186, to conform closely to the curvature of the drum itself.

If shaft 98 is rotated by the action of cam 54 against housing arm 100 and against spring 104, sleeve 112 is rotated. Lamp housing bracket 124, hanging upon sleeve 112 so that one end of slot 120 is in engagement with head 118, moves downwardly toward the drum as the shaft rotates, rotating sleeve 112. The bracket continues to move downwardly until the housing comes to rest upon the drum. Now shaft 98 may continue to rotate, to carry sleeve 112 with it. As it does so, head 118 moves free of the end of slot 120 with which it has been engaged. Sleeve 112 is now rotating relatively to bracket 124 which carries screw 156 along with it. Spring 152 is tensioned; housing 160 remains firmly engaged against the drum as the tension on spring 152 increases. Finally, cam end 56 moves to release its engagement with arm 106, and springs 104 and 152 are permitted to return so that housing 160 is lifted free of the drum.

Carried by cam 54 is a timer contact 218. Contact 218 may be held fixed to cam 54 by means of a pair of screws 220, which are engaged with cam 54 through a slot 222 in the contact. By loosening screws 220, it is possible to adjust the position of cam face 224, positioned adjacent cam end 56, with relation to that end, to effect certain timing effects for the energization of bulbs 22 in the manner to be described. Cam face 224 is intended to engage against the free end 226 of a timer contact arm 228, which is pivotally mounted upon a pin 230 fixed in a bracket 232.

Bracket 232, in turn, is fixed to but insulated electrically from frame wall 16 by any suitable means. Bracket 232 may have a pair of ears 234 and 236. A spring 238, anchored on ear 234, engages arm 228 above pin 230, and causes arm 228 normally to engage the end of a timer adjusting screw 240 threaded adjustably in ear 236. By adjustment of screw 240, contact arm 228 may be moved to adjust the time, earlier or later, for the engagement of timer contact 218 therewith, to control the time when exposure commences in relation to the time when a negative has been pressed against a sensitized member upon the drum. This adjustment thus assures that no light rays will emanate from the housing until sealing engagement between the housing and the drum takes place; the adjustment to some degree determines the length of time of the exposure.

Thus, by adjusting screw 240, or by adjusting the position of timer contact 218 with relation to cam 54, or by both adjustments, the moment of completion of the circuit between a conductor secured to bracket 232 and a conductor grounded upon frame wall 16, and, therefore, connected with timer contact 218, may be determined. Likewise, the interval of contact between end 226 and contact 218 may be determined by adjusting contact 218 along cam 54. The further cam face 224 moves away from rounded end 56, the shorter will be the time period during which contact 218 will complete its circuit with contact arm 228.

As the "after glow" from the heat rays of the light source might have a deleterious effect upon the rest of the sensitized member if the housing should leave the drum before such effect has worn off, timer contact end 226 should have been released from engagement with contact 218 a sufficient time interval before end 56 leaves arm 100 free to move the housing away from the drum. During the period that the ratchet is idle, and cam end 56 is dwelling upon arm 100, the housing will be stationary with respect to the drum. This occurs after rounded end 56 has engaged arm 100, and has forced housing 160 into light-sealing contact with the drum, which occurs at intermittent intervals as rounded end 56 engages arm 100 to force lamp housing 160 into engagement with the drum. At the opposite interval, that same end will engage against lever 52 to cause the drum to move to its next exposure position.

Cam end 58 serves, during these operations, to retain the opposite arm at a neutral position. During actuation of arm 100 by cam end 56, contact 218, for a certain portion of the time that the lamp housing is pressing positively against the drum surface, engages timing contact arm 228 to complete the circuit for bulbs 22. However, the circuit for those bulbs is broken before cam end 56 rides free of the surface of arm 100. As seen in Fig. 2, end 226 will have been freed of contact 218 before end 56, which is the arc of a circle having its center in shaft 36, finally moves to a position where arm 100 is permitted to fall to the smaller radius of the side face of the cam, and then to cam face 58, which likewise, although of smaller radius, is centered upon shaft 36.

For the purpose of completing the circuit from the drum to a conductor which, for grounding purposes, may be connected to the frame, the drum may be provided with a contact strip 242 secured to the surface of the drum adjacent that end of the drum adjacent frame wall 16. A drum contact post 244 may be mounted upon base 12. This post may include a base 246 having a substantially integral upright 248. A spring 250, engaged with the upright, in turn engages a contact finger 252 which is pivotally mounted upon a cross pin fixed in base 246. Finger 252 carries a contact 254 which is in position to be pressed against strip 242 by means of spring 250. Strip 242 preferably is not continuous, but has a break provided by an insulating strip 256 which extends for a small portion of the circumference of the drum. This insulating strip is effective at that portion of the rotation of the drum during which the lamp housing moves from a position where it has been making exposures on one line circumferentially of the light sensitized member 162 to a position where it can make exposures on any other such line, immediately adjacent the first line. To effect movement of the lamp housing to this new line, mechanism including catch bar 134 becomes effective.

Catch bar 134, positioned within groove 108 in shaft 98, has its arms 132 disposed on opposite sides of leg 130, against which the side edges of the medial gap 258 engage. Bar 134 may move vertically, and is lifted from its normal position, where arms 132 rest on faces 128, by means of trips 262. A trip 262, which consists of a cam 266, is secured to bar 134 at each end, and held in that position by suitable means such as a screw. Immediately adjacent each cam 266, and slidable in a kerf 272 in shaft 98 leading into groove 108, is a guide pin 274, fixed to bar 134 or an extension therefrom in any suitable manner, as, for instance, by threading. Between a cap 280 secured to shaft 98 over kerf 272, and bar 134, is disposed a spring 282, which serves to retain bar 134 pressed normally downwardly against faces 128, and also to hold cams 266 in position to be engaged in the manner to be described.

Cam 266 is provided with a face 284. A cam or kicker 286 is fixed to drum 18 and extends therefrom so that, on one of the adjustments of the drum by cam end 56, the kicker will engage cam face 284, and thereby cause catch bar 134 to rise against the action of gravity, and of springs 282.

When the trip is moved upwardly by kicker 286, the tooth 146 which, up to this time, has been engaged against the end wall of member 114, is lifted free of that end wall. Under the action of flexible band 138, and the spring acting thereon, sleeve 112 and its associated parts will tend to move toward the left in Figs. 8 and 9. Immediately that that tooth 146 passes beyond member 114, kicker 286 will have moved from beneath cam face 284, and the bar will drop. The next tooth 146 then rides into engagement with member 114, bringing the apparatus to a stop in its new position. The apparatus now proceeds automatically with the production of another series of exposures at the new section of light sensitized member 162.

During the interval that this change is taking place, contact 254 will have ridden into engagement with insulating strip 256, and not with strip 242, as this position is intended to coincide with the break between the edges of sheet 162 (Fig. 1). As the apparatus is now cycled by cam end 56, no illumination occurs during the time that the lamp housings are pressed against member 162. Then, cam end 56 proceeds to move the drum to bring the next live portion of sheet 162 away from the edges into position, and insulating strip 256 is moved out of position. In the final stage, when the drum is rotated to its last position and the circuit for the motor is broken, finger 252 is brought into position and remains in engagement with strip 256. Thus, the light bulbs produce no further illumination, and remains deenergized, until the apparatus is set in motion for another similar series of exposures.

On this last movement of sleeve 112 with relation to shaft 98, the sleeve engages a pin 288 which projects through an opening in frame wall 14. The pin, beyond wall 14, is driven into engagement with a contact finger 292, pivotally mounted in a bracket 294 secured to wall 14. A spring 296 maintains finger 292 normally pressed against the end of pin 288; when sleeve 112 is not in contact with pin 288, spring 296 maintains a contact 298 on finger 292 and a contact 300 on wall 14 in engagement, to complete the circuit for the motor. Contacts 298 and 300 are insulated from finger 292 and wall 14, respectively, and suitable conductors may be secured thereto properly to complete the motor circuit. When sleeve 112 engages pin 288 and projects it to cause finger 292 to pivot, the circuit at contacts 298 and 300 will be broken, and the motor stopped. Thus, at the limit of movement of the lamp housing, the apparatus is shut down automatically.

On Fig. 13, is shown a wiring diagram for the apparatus. From a source of power 302, conductors lead to bulbs 22. From the bulbs, a conductor leads to a lamp switch 304, and then back to the source of power. This switch serves to provide illumination when a negative is being set in position at opening 176. In parallel with that circuit is the timing circuit, conductor 306 leading from bulbs 22 to contact post 244, which, in turn, of course, will be connected electrically with strip 242. The circuit will then be completed through timer contact 218, contact arm 228, conductor 308, and back to source 302.

A separate line is necessary for motor 24. A separate switch 310 provides for manual control of the operation of the motor. This switch is in series with circuit breaker 312 which includes contact finger 292, and with the motor.

In operation, a member 162, which consists essentially of light sensitized material of any type, cut to length and width to fit accurately upon drum 18, is secured in position under clips 314, provided on the surface of the drum for that purpose. The lamp housings may first have been pivoted up into position to provide access to slits 192. This is possible since lamp housing bracket 124 is movable with respect to sleeve 112 in that direction. Knob 214 is actuated so that fingers 194 will be free of the inner face of wall 186. A negative 164 is slid through the slits so that it will be in position to conform to the shape of wall 186. Then knob 214 is manipulated again, and the negative-engaging surfaces 196 of fingers 194 clamp the negative positively in position.

Housing 160 is now lowered into position toward the drum, and sleeve 112, with the housing carried thereby, is moved manually to the extreme lateral limit of its movement. This can be effected merely by pushing against the lamp housing. Teeth 146, in the reverse direction of movement, are formed with cam faces 316 to facilitate this action. At the limit of movement of the sleeve, the housing is released and channel key member 114 is brought into abutment with the first tooth 146 through the action of the proper spring. Then, by closing switch 310, the apparatus is placed in operation. The entire apparatus is operated in the dark, or otherwise, as, for instance, under a "safe" light, to protect sensitized member 162 against light rays during the time the member is upon the drum.

The first action of the apparatus is to rotate ratchet 46, as cam end 56 engages against lever 52 and pushes it down. When cam end 56 now moves away from lever 52, pawl 86 engages the ratchet, to hold the drum positively in fixed position. Now end 56 rides up into engagement with arm 100. Its action is now, first to permit housing 160 to come down into contact with the drum, and then to press the housing further, through spring 152, to assure that the negative is substantially directly in contact with member 162. As end 56 continues its movement, timer contact 218 comes into engagement with arm 228, completing the circuit for sockets 184. The circuit will be broken as cam face 224 leaves arm 228, which will be well in advance of the time when end 56 releases arm 100 to permit the housing to be released from the drum.

The operations of moving the drum and bringing the housing into exposure position and making the exposures will be continued until substantially a complete rotation of the drum at that one position will have been made. Then kicker 286 moves into position to lift catch bar 134; sleeve 112 and the housing assembled therewith then move to the next tooth 146. During that time, contact finger 252 is moved into engagement with insulating strip 256. Then rotation commences again at the new line, with the housing located at another band of the sensitized member. Finally, when the entire member 162 has been exposed properly, sleeve 112 moves into engagement with pin 288, to break the motor circuit and shut down the apparatus.

Many other changes could be effected in the particular construction, and in the methods of use and construction, and in specific details thereof, hereinbefore set forth, without substantially departing from the invention defined in the claims, the specific description being merely of an embodiment capable of illustrating certain principles of the invention.

What is claimed as new and useful is:

1. Apparatus for producing exposures at spaced intervals upon a light sensitized member, the apparatus comprising means for retaining the sensitized member in substantially cylindrical form, a light source, means for retaining a light-transmitting member to control light rays from the source to the sensitized member in a form to conform substantially uniformly to the cylindrical form of the sensitized member, means for effecting step-by-step rotation of the light-transmitting member and the sensitized member relative to each other continuously in one direction automatically to index the members into association with each other at spaced apart areas of the sensitized member, means controlled synchronously with the step-by-step rotation means automatically to bring the source, the light-transmitting member and the sensitized member into substantially superimposed relationship at spaced intervals, and means for automatically making the source effective only when the light-transmitting member and the sensitized member assume a fixed, substantially contiguous, relative position in the superimposed relationship.

2. Apparatus for producing a plurality of exposures of a single negative upon a single light-sensitized member, the apparatus including means for retaining the negative, means for retaining the member in substantially cylindrical form, means for automatically presenting the negative to the cylindrically formed surface of the member at spaced apart intervals, the presenting means including means to present the negative to different portions of the member by automatically effecting step-by-step relative rotation of the negative-retaining means and the member-retaining means continuously in one direction automatically to index the members into association with each other at spaced apart areas of the sensitized member, synchronously energized means for automatically moving the negative-retaining means and the member-retaining means toward and away from each other in synchronism with the step-by-step rotation, and means for automatically causing relative displacement of the negative-retaining and the member-retaining means longitudinally with relation to each other in synchronism with the step-by-step rotation.

3. Apparatus for producing a plurality of exposures of a single negative upon a single light-sensitized member, the apparatus including means for retaining the member in substantially cylindrical form, automatic means for presenting the negative to the cylindrically formed surface of the member at spaced apart intervals; the presenting means including means for automatically effecting step-by-step relative rotation of the negative and the retaining means continuously in one direction to index the members into association with each other at spaced apart areas of the sensitized member, means for automatically moving the negative-retaining means and the member-retaining means toward and away from each other in synchronism with the automatic indexing of the members along a predetermined line, and means actuated automatically by completion of such predetermined line for causing displacement of the negative and the retaining means relatively to each other parallel to the axis of the cylinder so that the negative and the retaining means are automatically positioned to cooperate with each other along another line at a distance from the first predetermined line equal at least to the width of the negative.

4. Apparatus for producing a plurality of exposures of a single negative upon a single light-sensitized member, the apparatus including means for retaining the member in substantially cylindrical form, means for automatically presenting the negative to the cylindrically formed surface of the member at spaced apart intervals; the presenting means including means for automatically effecting step-by-step relative rotation of the negative and the retaining means continuously in one direction to index the members into association with each other at spaced apart areas of the sensitized member, means for automatically moving the negative-retaining and the member-retaining means toward and away from each other along a predetermined line, means actuated automatically by completion of such predetermined line for causing displacement of the negative and the retaining means relatively to each other parallel to the axis of the cylinder so that the negative and the retaining means are automatically positioned to cooperate with each other along the line parallel to the first predetermined line.

5. Apparatus for producing a plurality of exposures of a single negative upon a single light-sensitized member, the apparatus including means for retaining the negative, the retaining means including a light source, means for retaining the member in substantially cylindrical form, means for automatically presenting the negative-retaining means to dispose the negative in exposure proximity to the member at successive and spaced apart positions, the presenting means including means for automatically effecting step-by-step relative rotation of the negative-retaining means and the member-retaining means continuously in one direction to index the negative-retaining means and the member-retaining means into association with each other at spaced apart areas of the sensitized member and simultaneous movement of the negative-retaining means and the member-retaining means toward and away from each other and longitudinally with relation to each other, the negative-retaining means comprising means for shielding from light rays from the light source all of the member except that in exposure proximity to the negative, and means for automatically energizing the light source only after the negative has reached the position of exposure proximity to the member.

6. Apparatus for producing a plurality of exposures of a single negative upon a single light-sensitized member, the apparatus including means for retaining the negative, the retaining means including a light source, means for retaining the member in substantially cylindrical form, means for presenting the negative-retaining means to dispose the negative in exposure proximity to spaced apart areas of the cylindrically formed surface of the member and to remove the negative from that association with the member, automatic means for effecting step-by-step relative rotation of the negative-retaining means and the member-retaining means to index the negative-retaining means into association with different spaced portions of the member, means for actuating the rotation-effecting means, and means for automatically energizing the actuating means and the presenting means to cause the presenting means first to remove the negative from association with the member and then to make the actuating means effective.

7. Apparatus for producing a plurality of exposures of a single negative upon a single light-sensitized member, the apparatus including means for retaining the negative, the retaining means including a light source, rotatable means for retaining the member, means for presenting the negative-retaining means to dispose the negative in exposure proximity to the member and to remove the negative from that association with the member, means for rotating the member-retaining means, means for actuating the rotating means automatically to index the member-retaining means to present a new spaced apart area of the member for the negative, and means for automatically energizing the actuating means and the presenting means to cause the presenting means first to remove the negative from association with the member and then to make the actuating means effective.

8. Apparatus for producing a plurality of exposures of a single negative upon a single light-sensitized member, the apparatus including means for retaining the negative, the retaining means including a light source, means for retaining the member in substantially cylindrical form, means for presenting the negative-retaining means automatically to index the negative in exposure proximity to spaced apart areas of the cylindrically formed surface of the member and to remove the negative from that association with spaced apart areas of the member, indexing means including means for effecting step-by-step relative rotation of the negative-retaining means and the member-retaining means to bring the negative-retaining means into association with spaced apart portions of the member, means for energizing the light source, means for actuating the rotation-effecting means, and means for timing the actuating means and the presenting means to prevent the energizing means from becoming effective while the presenting means and the rotation-effecting means are in action.

9. Apparatus for producing a plurality of exposures of a single negative upon a single light-sensitized member, the apparatus including a continuously rotated shaft, means for retaining the negative, the retaining means including a light source, means for retaining the member in substantially cylindrical form, means driven by the shaft for automatically indexing the member and for presenting the negative-retaining means to dispose the negative in exposure proximity to spaced apart areas of the cylindrically formed surface of the member and to remove the negative from that association with the member, means for energizing the light source, means driven by the shaft for actuating the light-energizing means, the actuating means and the presenting means being in driven relation with the shaft, and timing means associated with the shaft to cause the presenting means automatically to bring the negative to rest in exposure proximity with the member at each of the spaced apart areas and then to actuate the energizing means.

10. Apparatus for producing a plurality of exposures of a single negative upon a single light-sensitized member, the apparatus including a continuously rotated shaft, means for retaining the negative, the retaining means including a light source, means for retaining the member in substantially cylindrical form, means driven by the shaft for automatically presenting the negative-retaining means to dispose the negative in exposure proximity to the cylindrically formed surface of the member and to remove the negative from that association with the member, means for effecting step-by-step relative rotation of the negative-retaining means and the member-retaining means to index the member-retaining means so that the negative-retaining means automatically will be brought into association with successive spaced apart portions of the member, means for energizing the light source, means driven by the shaft for actuating the rotation-effecting means, and timing means driven by the shaft for automatically cutting out the energizing means during the time that the negative is being moved by the presenting means or the rotation-effecting means is in action, the timing means comprising means to actuate the light-source-energizing means automatically only after the presenting means has disposed the negative in exposure proximity to the member.

11. Apparatus for producing a plurality of exposures of a single negative upon a single light-sensitized member, the apparatus including a continuously rotated shaft, means for retaining the negative, the retaining means including a light source, means for retaining the member in substantially cylindrical form, means for presenting the negative-retaining means automatically to dispose the negative in exposure proximity to the cylindrically formed surface of the member and to remove the negative from that association with the member, means for effecting step-by-step relative rotation of the negative-retaining means and the member-retaining means automatically to index the member-retaining means so that the negative-retaining means automatically will be brought into association with successive spaced apart portions of the member, means for energizing the light source, means including a member driven by the shaft for actuating the rotation-effecting means, and timing means including said member driven by the shaft automatically to cut the energizing means out during the time that the negative is being positioned by the presenting means or the rotation-effecting means is in action, the member comprising means to actuate the presenting means automatically to dispose the negative in exposure proximity to the member and thereafter to actuate the light-source-energizing means.

12. Apparatus for producing a plurality of exposures of a single negative upon a single light-sensitized member, the apparatus including a continuously rotated shaft, means for retaining the negative, the retaining means including a light source, a drum for retaining the member, means for presenting the negative into exposure proximity to the drum and for removing the negative from that association with the drum, means for rotating the drum automatically to index the drum to bring spaced apart areas of the member into position for association therewith of the negative, the negative-retaining means comprising means for shielding from light rays from the light source all of the member except that in exposure proximity to the negative, means for energizing the light source, and means driven by the shaft for actuating the presenting means and the energizing means, the actuating means comprising timing means automatically to actuate the energizing means after the presenting means has positioned the negative in exposure proximity to the drum and during the time that the negative remains in such exposure proximity to the drum.

13. Apparatus for producing a plurality of exposures of a single negative upon a single light-sensitized member, the apparatus including a continuously rotating shaft, means for retaining the negative, the retaining means including a light source, a drum for retaining the member, means for presenting the negative into exposure proximity to the drum and for removing the negative from that association with the drum, means for rotating the drum automatically to index the drum to bring spaced apart areas of the member into position for association therewith of the negative, the negative-retaining means comprising means for shielding from light rays from the source all of the member except that in exposure proximity to the negative, means for energizing the light source, and means driven by the shaft for actuating the presenting means and the energizing means, the actuating means comprising timing means automatically to actuate the energizing means when the presenting means has positioned the negative in exposure proximity to the drum, the timing means comprising means automatically to move the presenting means to remove the negative from exposure proximity to the drum before actuating the rotating means.

14. Apparatus for producing a plurality of exposures of a single negative upon a single light-sensitized member, the apparatus including a continuously rotated shaft, means for retaining the negative, the retaining means including a light source, means for retaining the member, means driven by the shaft for presenting the negative to the member and for removing the negative from that association with the member, means in driven relation with the shaft for effecting relative rotation of the negative-retaining means and the member-retaining means automatically to index the member-retaining means so that the negative-retaining means may be brought into association with the member successively at spaced apart portions of the member along a predetermined line, means for causing lateral translation of the negative-retaining means and the member-retaining means relatively to each other, and means made effective automatically by completion of a rotation of the retaining means for making the lateral translation means effective.

15. Apparatus for producing a plurality of substantially identical exposures upon a light sensitized member, the light sensitized member being of substantially cylindrical form, means comprising a light source and means for receiving a negative to control light rays emanating from the light source, means for supporting the light source and negative-receiving means, means for causing step-by-step rotation of the light-sensitized member automatically to index the light-sensitized member into a plurality of spaced apart positions, means to actuate the supporting means to move the light source and the negative-receiving means toward and away from the surface of the light-sensitized member, and a single continuously rotated member for energizing the rotation-causing means and the actuating means, the member comprising timing means automatically to energize the rotation-causing means only after the actuating means has been energized by the member to move the negative-receiving means away from the surface of the light-sensitized member.

ELI FUCHS.

REFERENCES CITED

The following references are of record in the file of this patent:

UNITED STATES PATENTS

| Number | Name | Date |
|---|---|---|
| 1,051,997 | Holst | Feb. 4, 1913 |
| 1,107,520 | Holst | Aug. 18, 1914 |
| 2,091,280 | Huebner | Aug. 31, 1937 |
| 2,143,984 | Huggins | Jan. 17, 1939 |
| 2,170,896 | Henderson | Aug. 29, 1939 |

FOREIGN PATENTS

| Number | Country | Date |
|---|---|---|
| 375,752 | France | May 22, 1907 |